(12) United States Patent  
Schneider

(10) Patent No.: US 8,077,868 B2  
(45) Date of Patent: Dec. 13, 2011

(54) MECHANISM FOR TRANSPORT-SAFE CODINGS FOR CRYPTOGRAPHIC USE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 853 days.

(21) Appl. No.: 12/156,328

(22) Filed: May 30, 2008

(65) Prior Publication Data

US 2009/0323938 A1 Dec. 31, 2009

(51) Int. Cl.
*H04L 9/00* (2006.01)
(52) U.S. Cl. ............. 380/42; 380/255; 380/28; 713/150
(58) Field of Classification Search ..................... 380/42
See application file for complete search history.

(56) References Cited

U.S. PATENT DOCUMENTS

2008/0040650 A1* 2/2008 Lablans ........................ 714/784

* cited by examiner

*Primary Examiner* — Ponnoreay Pich
(74) *Attorney, Agent, or Firm* — Lowenstein Sandler PC

(57) ABSTRACT

In one embodiment, a mechanism for transport-safe codings for cryptographic use is disclosed. In one embodiment, a method for transport-safe coding for cryptographic use includes converting an input data stream into index values associated with "n" printable characters, wherein "n" is a radix associated with a base-"n" coding scheme and a prime power less than 94, performing a cryptographic operation on the index values to encrypt the index values, and translating the encrypted values directly into an output data stream of printable characters associated with the encrypted values in a base-"n" coding scheme.

20 Claims, 4 Drawing Sheets

MECHANISM FOR TRANSPORT-SAFE CODINGS FOR CRYPTOGRAPHIC USE

TECHNICAL FIELD

The embodiments of the invention relate generally to transfer coding and cryptography and, more specifically, relate to mechanisms for transport-safe codings for cryptographic use.

BACKGROUND

Binary-to-text coding or transfer coding comes from a need to communicate arbitrary binary data over pre-existing communication protocols that were designed to carry only human-readable text. For example, some pre-existing communication protocols may support only American Standard Code for Information Interchange (ASCII), and within that, reserve certain of the ASCII control codes (0-31 and 127) for their own use. Thus, only 94 printable characters may be "safe" to use to convey or transport data. Some currently available techniques for binary-to-text encoding for safe transport of data via email or similar text-based transport include base-64 and base-85 encoding.

Base-64 encoding is typically used for sending binary data via the Multipurpose Internet Mail Extensions (MIME) specification. Implementations of base-64 encoding use 64 of the 94 printable characters for the representation, including the capital letters A-Z, the lowercase letters a-z, the decimal numbers 0-9, two additional value characters (e.g., "/" and "+"; or "." and "+"; or "−" and "_"), and an additional filler character (e.g., "="). Base-64 encoding operates by taking 3 bytes (24 bits) at a time of the input to be encoded, joining these 3 bytes into a 24-bit buffer, converting packs of 6 bits of the 24-bit group into 4 index number representations of the 6-bit packs (as 6 bits has a maximum of 64 different binary values), and then converting these index numbers into their corresponding values in the base-64 alphabet table. In summary, base-64 encoding converts 3 uncoded bytes into 4 encoded printable characters.

Base-85 encoding is typically used to encode. IPv6 addresses. Implementations of base-85 encoding use 85 of the 94 printable characters for the representation. For example, most implementations of base-85, encoding use ASCII printable characters from code 33 ("!") to code 117 ("u") in their representation. The basis behind base-85 is that 4 bytes (32 bits) can represent $2^{32}=4,294,967,296$ possible values, while 5 base-85 digits provide $85^5=4,437,053,125$ possible values; enough to provide for a unique representation for each possible 32-bit value. In addition, 32 bits is a popular computer word size. Base-85 encoding operates by taking 4 bytes of input data as a 32-bit binary number (most significant byte first), converting by repeatedly dividing by 85 and taking the remainder into 5 base-85 digits (index numbers), and then encoding the 5 index numbers (most significant first) as printable characters by adding 33 to them to give the corresponding ASCII character (from codes 33 to 117). In summary, base-85 encoding converts 4 uncoded bytes into 5 encoded printable characters.

However, these prior art binary-to-text encoding techniques are only useful for the actual transport of data. The values produced by these encodings cannot be operated on in most cases without decoding. For example, if a document is to be encrypted and transported via email using base-64 encoding, then multiple steps would have to take place. First, the encryption algorithm would run over the document and produce an encrypted result. Then, the base-64 encoder would then run over the encrypted result to create a base-64 equivalent output for safe transport via email. Once the recipient receives the email, they would have to decode using the base-64 coding and run that result through the decryption algorithm.

As the above example makes clear, utilizing cryptographic applications in tandem with a transport-safe encoding mechanism is difficult, if not impossible, to accomplish in some scenarios. Many classes of cryptographic algorithms cannot run without first transcoding the binary-to-text encodings to another representation. Therefore, a solution that allows for transport-safe coding of binary-to-text data in tandem with a cryptographic algorithm application, without having to transcode the binary-to-text encoded data to another representation would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
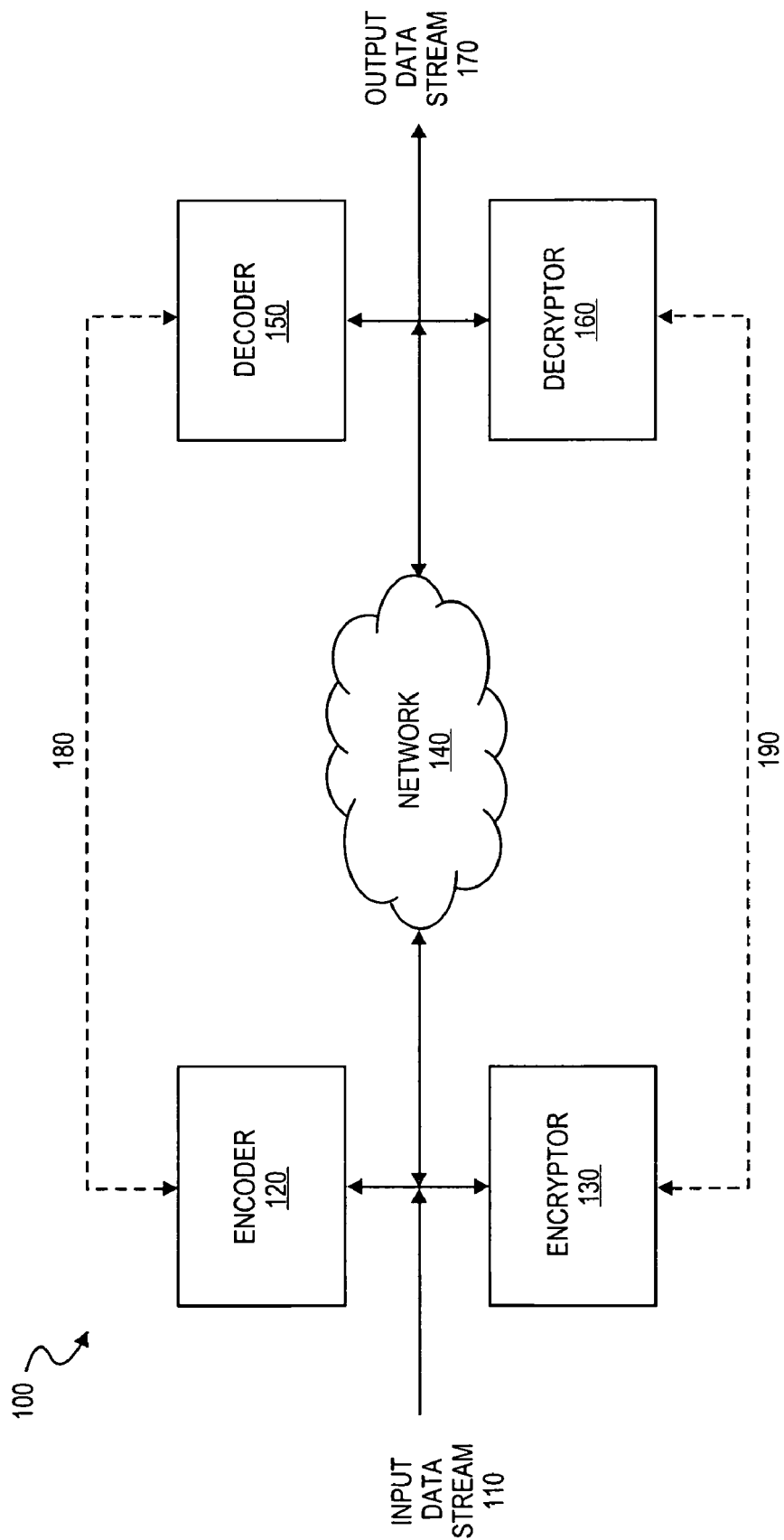
FIG. 1 is a block diagram of a transport system to perform embodiments of the invention.

Embodiments of the invention provide for mechanisms for transport-safe codings for cryptographic use. In one embodiment, a method of transport-safe codings for cryptographic use includes converting an input data stream into index values associated with "n" printable characters, wherein "n" is a radix associated with a base-"n" coding scheme and a prime power less than 94, performing a cryptographic operation on the index values to encrypt the index values, and translating the encrypted values directly into an output data stream of printable characters associated with the encrypted values in a base-"n" coding scheme.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide for transport-safe coding for cryptographic use. Embodiments of the invention accomplish transport-safe coding for cryptographic use by utilizing integer codings with a prime radix, or base, of less than 94. The radix or base is the number of unique digits, including zero, that a positional numeral system uses to represent numbers. The value 94 comes from the fact that there are 94 printable characters, such as, for example, ASCII characters. One skilled in the art will appreciate that various communication protocols may be utilized by embodiments of the invention, and are not limited to solely ASCII. For example, other character sets such as UTF-8, various ISO-Latin alphabets, and several EBCDIC variants may be utilized in embodiments of the invention.

The coding of embodiments of the invention allows for both communications via an email message or sent across some other non-binary-safe link and direct use by certain cryptographic algorithms. Using prime radixes can be convenient for various classes of cryptographic operations. For example, for cryptographic operations that depend upon operating over an extension field, these algorithms must use either a prime number or a power of a prime number ("prime power"), which embodiments of the invention provide. For example, a prime power less than 94 may include 3, 9, or 81 which are all powers of the prime number 3.

FIG. 1 is a block diagram of a transport system 100 to perform embodiments of the invention. System 100 includes an encoder 120 and an encryptor 130 coupled either via network 140 or directly 180, 190 to decoder 150 and decryptor 160. Encoder 120 and encryptor 130 are communicably coupled together to receive input and output from each other, as well as to receive an input data stream 110. Encoder 120 and encryptor 130 may operate on the input data stream 110 to both encode and encrypt the input data stream 110 according to embodiments of the invention.

An encoded and encrypted data stream is then passed to either of decoder 150 or decryptor 160 via network 140 or via a direct connection 180, 190. Decoder 150 and decryptor 160 may operate in any order to both decode and decrypt the received data stream and produce output data stream 170 according to embodiments of the invention.

Figure 2:
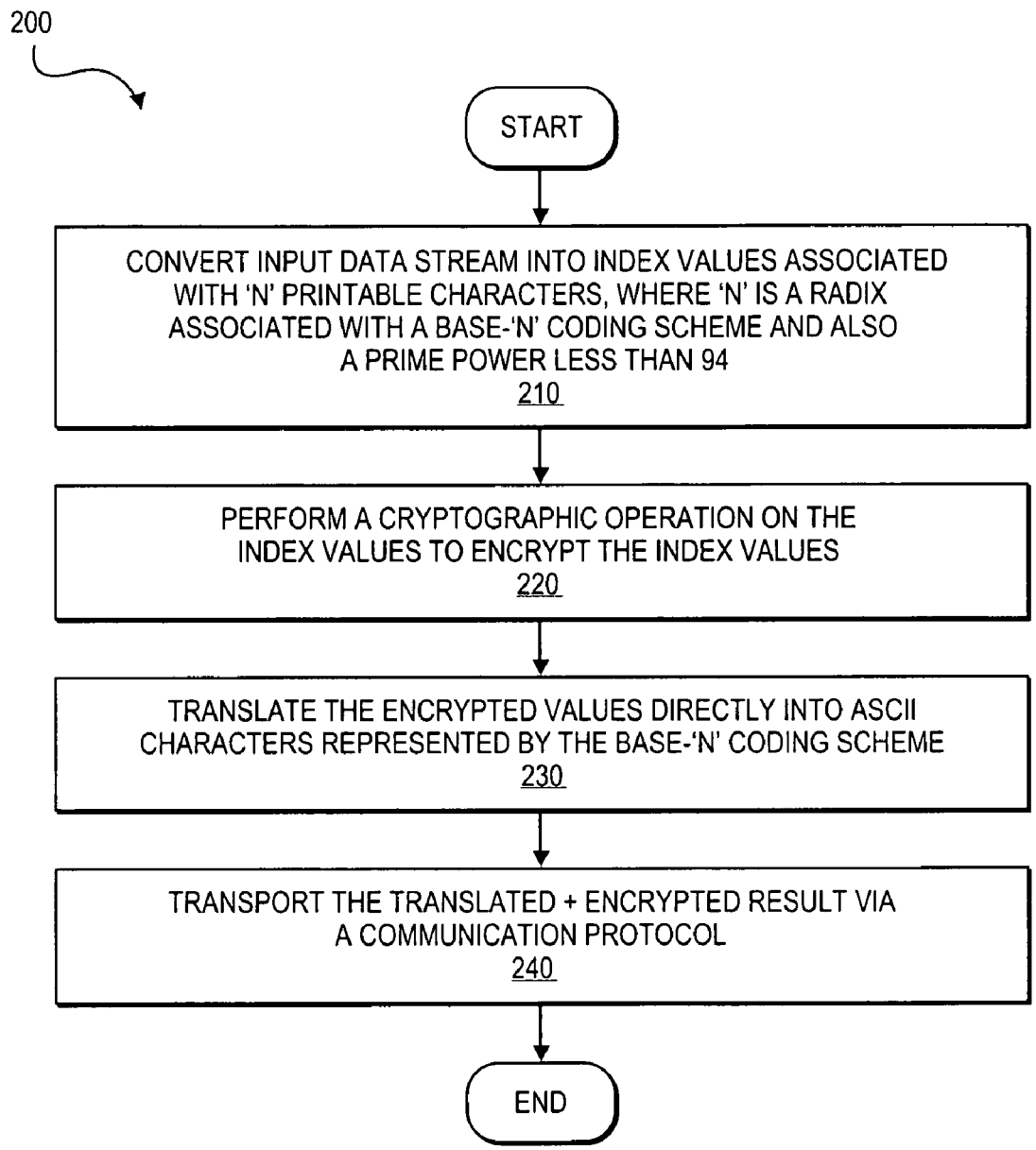
FIG. 2 is a flow diagram illustrating a method for transport-safe coding for cryptographic use according to an embodiment of the invention.

FIG. 2 is a flow diagram illustrating a method 200 for transport-safe coding for cryptographic use according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by an encoder and an encryptor, such as encoder 120 and encryptor 130 described with respect to FIG. 1.

Method 200 begins at block 210 where an input data stream is converted into index values associated with "n" printable characters, such as, for example, ASCII characters. The "n" value is a radix associated with a base-"n" coding scheme and is also a prime power less than 94. At block 220, a cryptographic operation is performed on the produced index values in order to encrypt the index values. Then, at block 230, the encrypted values are translated directly into printable characters represented by the base-"n" coding scheme. Lastly, at block 240, the translated and encrypted result is transported via a communication protocol, such as email. In one embodiment, method 200 may be performed in an inverse or reverse order at a decoder and decryptor, such as decoder 150 or decryptor 160 described with respect to FIG. 1.

Embodiments of the invention, such as the embodiment described by method 200 of FIG. 2, provide transport coding that uses a prime power as radix or base for coding. In one case, this prime power radix is beneficial for cryptography applications that construct an extension field over a given prime power and perform various operations over that field. In addition, embodiments of the invention eliminate any need for transcoding between a binary format and text format to perform such cryptographic operations.

For example, if cryptographic operations are being performed in the extension field over 89 (which is prime and <94), then the numerical equivalent for the particular code could be found and used for the encryption operations. Subsequently, the result could just be directly translated from codes in a base-89 coding table. For example, for base-89 coding, the ASCII alphabet starting with ASCII code of 33 to code 121, inclusive, may be used to represent ASCII values from "!" to lower case "y" as output values. The coding scheme can operate on the encryption values directly and does not have to convert back into a binary value into order to perform the encoding operations. As a result, using these particular prime radix codings may be more efficient for some classes of cryptographic functions over these particular fields.

One exemplary radix that may be utilized in an embodiment of the invention is 37. Using a 37 radix results in coding 20 characters for every 13 bytes. This radix may be appropriate for transport where letter case cannot be reliably sent (only needs a-z, 0-9, and one symbol). In addition, base-37 not only lends itself to email safe transport, but also to Morse-safe transport as Morse code has 26 letters and 10 digits and a few symbols. Also of note is that base-37 provides the most expansion in terms of standard binary or standard computer representation.

Another exemplary radix that may be utilized in an embodiment of the invention is 67. Using a 67 radix results in coding 4 characters for 3 bytes. In comparison to other prior art encoding techniques, base-67 has a virtually identical overhead to base-64.

Yet another exemplary radix that may be utilized in an embodiment of the invention is 89. Using an 89 radix results in coding 5 characters for 4 every bytes. In comparison to other prior art encoding techniques, base 89 has a virtually identical overhead to base-85.

Deciding which prime radix number to implement in embodiments of the invention depends on the cryptographic function that is being utilized with the encoding. When constructing a particular field for a cryptographic application, numbers that are hundreds or thousands of bits long can be factored and it may be that constructing a field with a 67 radix is better than an 89 radix, or vice versa, for example. In one embodiment, other prime powers in the range of 41-83 may also be used. In some cases, these other prime powers in range of 41 and 83 may provide a number that is easier to factor in the cryptographic application, which in turn may mean that a somewhat larger field may be used and thereby provides better security. One skilled in the art will appreciate that a case-by-case assessment may be required to determine the best prime radix to implement in embodiments of the invention.

Figure 3:
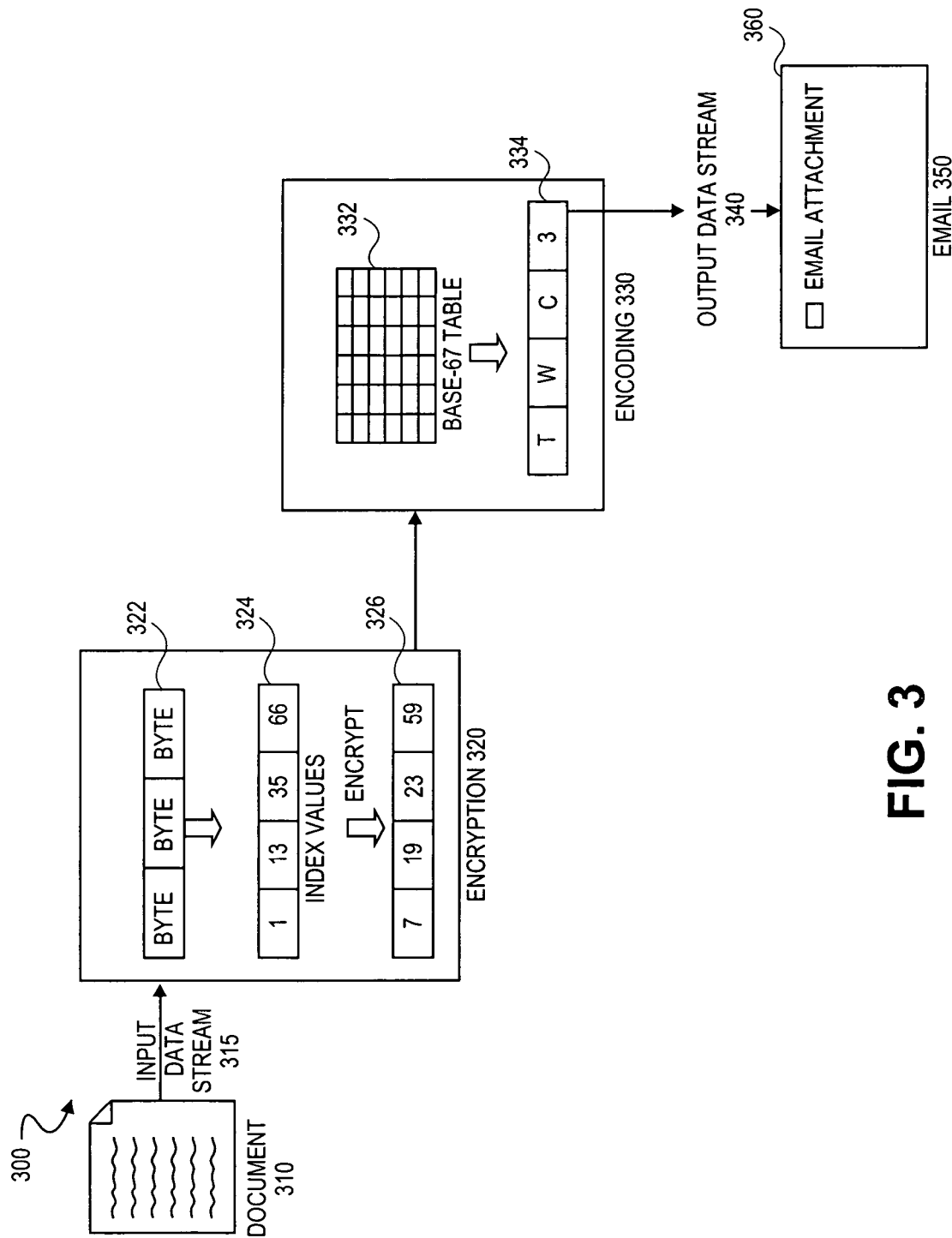
FIG. 3 depicts an exemplary encryption and encoding operation utilizing an embodiment of the invention.

FIG. 3 depicts an exemplary encryption and encoding operation utilizing an embodiment of the invention. In one embodiment, transport system 100 described with respect to FIG. 1 may perform the encryption and encoding operation 300 of FIG. 3. Encryption and encoding operation 300 is an example utilizing an encryption algorithm that depends upon performing operations in a prime field of 67 and also using an encoding scheme with a prime radix of 67 (base-67). As shown, instead of doing discrete transformations for each of the encryption and base-67 encoding schemes, the example utilizes one transformation of the data in order to apply to the encryption and encoding in tandem. One skilled in the art will appreciate that other prime radix numbers less than 94 may be utilized in other embodiments of the invention.

The illustrated example utilizes the encryption algorithm (320) to convert a document (310) into a series of index values (324). In this case, an input data stream (315) representing the document (310) is converted into 4 index value quadruples (324) (ordered quadruplet of numbers) for each three input bytes of data (322). Under the base-67 encoding scheme, these index values (324) are all in the range of 0-66. These particular values could then be used internally in the encryption algorithm (320) itself to produce additional sets of values (326) in the range of 0 to 66, which could then be directly translated or encoded (330) into characters (334) for transport without having to do any additional mathematical sets or bit manipulation steps.

In one embodiment, the encoding may be accomplished by referencing the index values (326) to a base-67 alphabet table (332) to determine the characters (334) for transport. It is fairly easy to pick 66 values that are going to be in range of all common character sets (e.g., upper case, lower case, digits, underscore, equal, dash, dot). The output data stream (340) of encrypted and encoded characters (334) may be utilized for safe transport, such as in an email attachment (360) of an email (350). In one embodiment, at the other end (not shown), a recipient would do an inverse look up to get the indexes back and perform inverse cryptographic function on the end, and then translate from the 0 to 66 values into original document.

Figure 4:
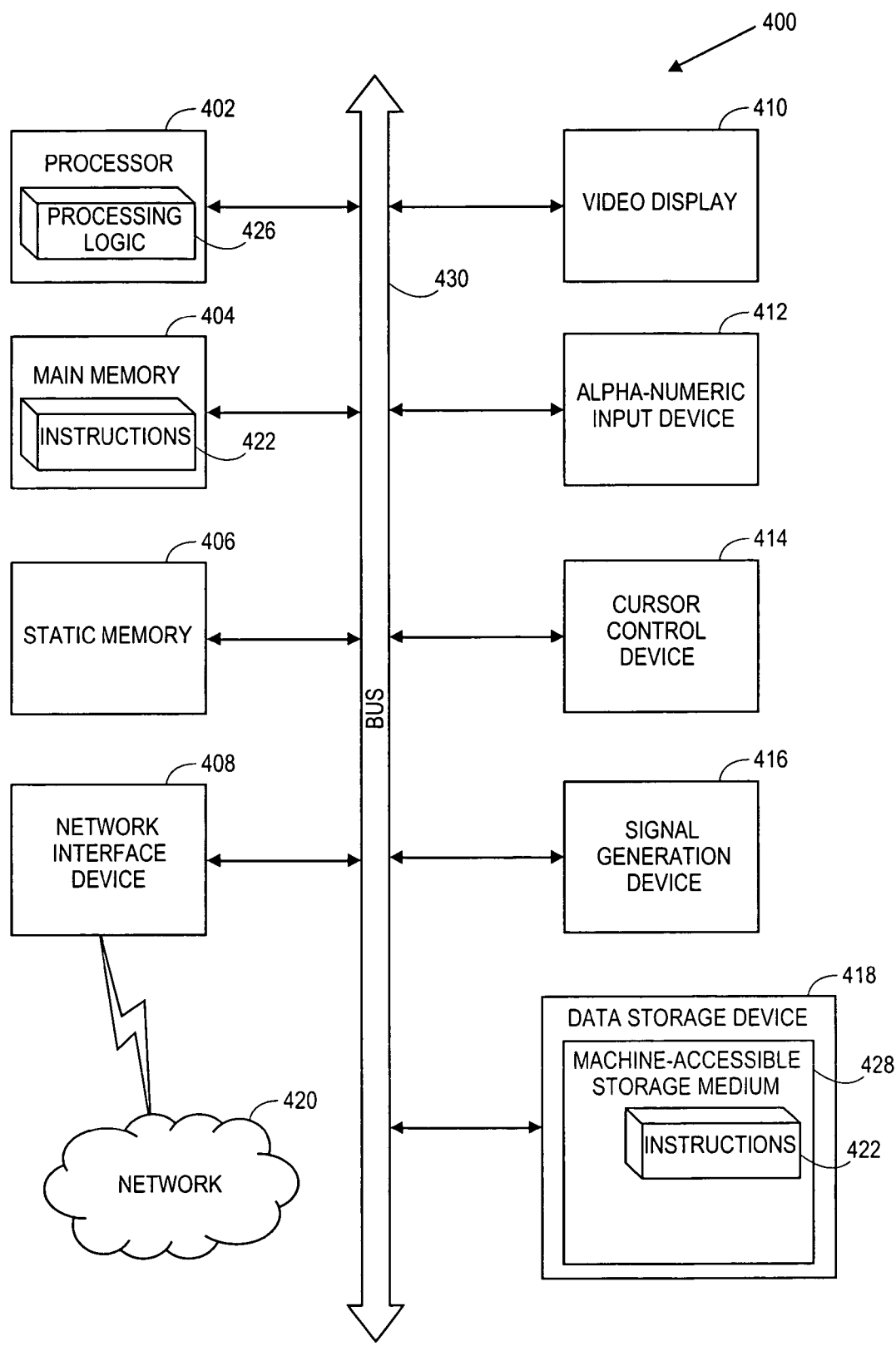
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine, is illustrated, the term "machine" shall also be taken to include any collection of machines that individually or jointly execute a set (or multiple sets) of instructions to perform any one or more of the methodologies discussed herein.

The exemplary computer system 400 includes a processing device, 402, a main memory 404 (e.g., read-only memory (ROM), flash memory, dynamic random access memory (DRAM), (such as synchronous DRAM (SDRAM) or Rambus DRAM (RDRAM), etc.), a static, memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to perform the operations of embodiments of the invention performed by an encoder, encryptor, decoder, or decryptor, such as encoder 120, encryptor 130, decoder 130, or decryptor 160 described with respect to FIG. 1, and/or used to store a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
converting an input data stream into index values associated with "n" printable characters, wherein "n" is a radix associated with a base-"n" coding scheme and a prime power less than 94;
performing a cryptographic operation on the index values to encrypt the index values; and
translating the encrypted values directly into an output data stream of printable characters associated with the encrypted values in a base-"n" coding scheme.

2. The method of claim 1, wherein the cryptographic operation is over an extension field of "n".

3. The method of claim 1, further comprising transporting the output data stream to a recipient via a communication protocol that is not safe for transporting binary values.

4. The method of claim 3, further comprising inversing the translating, performing, and converting operations at the recipient to reproduce the input data stream.

5. The method of claim 1, wherein translating the encrypted values is performed without transcoding the encrypted values into another coding representation.

6. The method of claim 1, wherein "n" is equal to at least one of 37, 67, or 89.

7. The method of claim 6, wherein "n" equal to 37 codes 20 characters for every 13 bytes of the input data stream, "n" equal to 67 codes 4 characters for every 3 bytes of the input data stream, and "n" equal to 89 codes 5 characters for every 4 bytes of the input data stream.

8. The method of claim 6, wherein translating the encrypted values for "n" equal to 67 further includes referencing an alphabet table for a base-67 coding scheme to determine the associated printable character for each encrypted value.

9. The method of claim 6, wherein translating the encrypted values for "n" equal to 89 further includes referencing an ASCII alphabet scheme from codes 33 to 121 inclusive to determine the associated ASCII character for each encrypted value.

10. A system, comprising:
a processing device;
a memory communicably coupled to the processing device to store an input data stream;
an encryptor communicably coupled to the processing device and the memory, the encryptor operable to:
convert the input data stream into index values associated with "n" printable characters, wherein "n" is a radix associated with a base-"n" coding scheme and a prime power less than 94; and
perform a cryptographic operation on the index values to encrypt the index values; and
an encoder communicably coupled to the processing device, memory, and encryptor, the encoder operable to translate the encrypted values directly into an output data stream of printable characters associated with the encrypted values in a base-"n" coding scheme.

11. The system of claim 10, wherein the cryptographic operation is over an extension field of "n".

12. The system of claim 10, further comprising a network device communicably coupled to the encoder and the encryptor to transport the output data stream to a recipient via a communication protocol that is not safe for transporting binary values.

13. The system of claim 10, wherein the encoder translates the encrypted values without transcoding the encrypted values into another coding representation.

14. The system of claim 10, wherein "n" is equal to at least one of 37, 67, or 89.

15. The system of claim 14, wherein "n" equal to 37 codes 20 characters for every 13 bytes of the input data stream, "n" equal to 67 codes 4 characters for every 3 bytes of the input data stream, and "n" equal to 89 codes 5 characters for every 4 bytes of the input data stream.

16. A non-transitory machine-readable storage medium including data that, when accessed by a machine, cause the machine to perform operations comprising:
converting an input data stream into index values associated with "n" printable characters, wherein "n" is a radix associated with a base-"n" coding scheme and a prime power less than 94;
performing a cryptographic operation on the index values to encrypt the index values; and
translating the encrypted values directly into an output data stream of printable characters associated with the encrypted values in a base-"n" coding scheme.

17. The non-transitory machine-readable storage medium of claim 16, wherein the cryptographic operation is over an extension field of "n".

18. The non-transitory machine-readable storage medium of claim 16, wherein translating the encrypted values is performed without transcoding the encrypted values into another coding representation.

19. The non-transitory machine-readable storage medium of claim 16, further comprising transporting the output data stream to a recipient via a communication protocol that is not safe for transporting binary values.

20. The non-transitory machine-readable storage medium of claim 19, further comprising inversing the translating, performing, and converting operations at the recipient to reproduce the input data stream.

* * * * *